United States Patent [19]
Hori et al.

[11] Patent Number: 5,701,182
[45] Date of Patent: Dec. 23, 1997

[54] COLOR IMAGE FORMING APPARATUS AND METHOD THEREOF

[75] Inventors: Kenjiro Hori, Tokorozawa; Satoshi Akiyama, Yokohama; Takefumi Takubo, Yokohama; Tetsuo Kishida, Yokohama, all of Japan

[73] Assignee: Canon Kabushiki Kaisha, Tokyo, Japan

[21] Appl. No.: 68,203

[22] Filed: May 27, 1993

[30] Foreign Application Priority Data

May 29, 1992 [JP] Japan ................... 4-139094

[51] Int. Cl.$^6$ .................... H04N 1/21; H04N 1/46
[52] U.S. Cl. .................... 358/296; 358/515; 358/524; 347/232
[58] Field of Search .................... 358/296, 300, 358/444, 515, 524, 530; 395/115, 116; 347/232

[56] References Cited

U.S. PATENT DOCUMENTS

| | | | |
|---|---|---|---|
| 4,670,795 | 6/1987 | Yamanishi | 358/296 |
| 5,168,292 | 12/1992 | Kadowaki et al. | 346/157 |

Primary Examiner—Benjamin R. Fuller
Assistant Examiner—Craig A. Hallacher
Attorney, Agent, or Firm—Fitzpatrick, Cella, Harper & Scinto

[57] ABSTRACT

A color image formation system in which transfer means for sequentially receiving plural color images is idled if raster image data for a color has not yet been converted from a page description language into the raster image. A page description language or other code data for a first color is converted into a raster image of the first color and an electrophotographic process is commenced whereby a laser beam is modulated in accordance with the raster image of the first color and the image formed by the modulated laser beam is transferred to rotatable transfer means. After image formation in the first color is complete, code data for the second color is converted into raster image data. If conversion of the second color is not yet complete but the transfer means has rotated to a position where it is ready to receive the second color, the transfer means is idled by continued rotation thereof and forcibly restricting laser beam illumination whereby the transfer means is fed blank to a predetermined position. The transfer means is idled until the conversion of second color is complete, whereafter the laser beam is modulated in accordance with the raster image of the second color to form the second color on the transfer means. Processing for third and subsequent colors is continued as above until a full color image has been formed on the transfer means.

28 Claims, 3 Drawing Sheets

COLOR IMAGE FORMING APPARATUS AND METHOD THEREOF

BACKGROUND OF THE INVENTION

1. Field of the Invention

The present invention relates to a color image forming apparatus, and more specifically, to a field-sequential type color image forming apparatus and a method thereof.

2. Description of the Related Art

Electrophotographic printers, such as a laser beam printer, are capable of a high-speed and high-definition printing, and have thus come into wide use rapidly. Also, there has been an increasing demand for color printing, and hence electrophotographic color printers have been demanded. Conventional electrophotographic multicolor printers are classified into multi-photosensitive member type printers and single photosensitive member/transfer drum type printers.

In the multi-photosensitive member type printer, plural photosensitive drums, one for each of printing colors, are aligned along a sheet conveying path, and the developing process is performed separately in the printing colors. For example, four photosensitive drums for yellow, cyan, magenta and black are provided, and the electrophotographic process is performed sequentially in each of the respective printing colors. In this type of printer, since the electrophotographic process can be conducted in a parallel fashion in the respective colors, a high-speed color printing can be achieved. However, the photosensitive drum, an exposure device, a charging device and a transfer device must be provided for each of the printing colors. Furthermore, a driving mechanism is necessary for each of the components. These increase the production costs, making multi-photosensitive member-type printers expensive.

In the single photosensitive drum type printer, plural developers, one for each of printing colors, are disposed adjacent a single photosensitive drum, and the developing/transfer process is performed in each of the printing colors separately on the printing sheet wound around the transfer drum. For example, four developers of yellow, cyan, magenta and blacks are disposed around the single photosensitive drum, and the electrophotographic process is performed separately in each of the respective colors. In this type of printer, since the electrophotographic process cannot be performed in a parallel fashion in the respective colors, the printing speed slows down. However, since it is not necessary for the photosensitive drum, the exposure device, the charging device and the transfer device to be provided for each of the printing colors, it is possible to manufacture a relatively inexpensive printer.

Whichever the type, whether multi-photosensitve member type or single photosensitive member/transfer drum type, once the electrophotographic process is started, it cannot be interrupted at least until after the exposure, development and transfer processes have been completed for one color or until after such processes have been completed for all the colors, because discontinuation generates color misregistration or density irregularities.

However, input data to electrophotographic printers is ordinarily input in a page description language which includes character code data and figure data and commands, and which must be converted into image data before it can be printed. Because it is impossible to interrupt the electrophotographic process, at least until after processing for one color is completed, an image memory (sometimes called a "page memory") is used to convert and store the input data for a full page. In the case of printing a binary image (a monochrome film) on a printing sheet of A4 at 300 dpi (dots per inch), an image memory of about one million bytes is necessary. In the case of multicolor printing, an image memory having a memory capacity proportional to the number or colors is required. In the case of printing in, for example, four colors of yellow, cyan, magenta and blacks, an image memory of about 3 M byte is required.

SUMMARY OF THE INVENTION

An object of the present invention is to provide a color image forming apparatus which requires a small memory capacity to form color images, and a method thereof.

Another object of the present invention is to provide a color image forming apparatus which is capable of forming color images at a high speed, and a method thereof.

To achieve the above objects, the present invention provides a color image forming apparatus which comprises an image memory capable of storing image data of a single color to be printed, image conversion means for converting the image data of a predetermined single color to be printed from an input signal and for storing the converted image data in the image memory, a photosensitive drum, latent image formation means for forming a latent image corresponding to the image stored in the image memory means on the photosensitive drum, developing means disposed around the photosensitive drum for each of colors to convert the latent image on the photosensitive drum into a toner image of each of the predetermined colors, transfer means for transferring the toner image onto a sheet, fixing means for fixing the toner image on the sheet, and control means for feeding the transfer means blank to a predetermined position when the transfer operation of the toner image of a first color onto the sheet has been completed before conversion of an image of a second color which follows the first color is completed.

The other objects and advantages of the invention will become apparent from the following description of an embodiment with reference to the accompanying drawings.

DETAILED DESCRIPTION OF THE PREFERRED EMBODIMENTS

An embodiment of the present invention will be described below with reference to the accompanying drawings.

Figure 1:
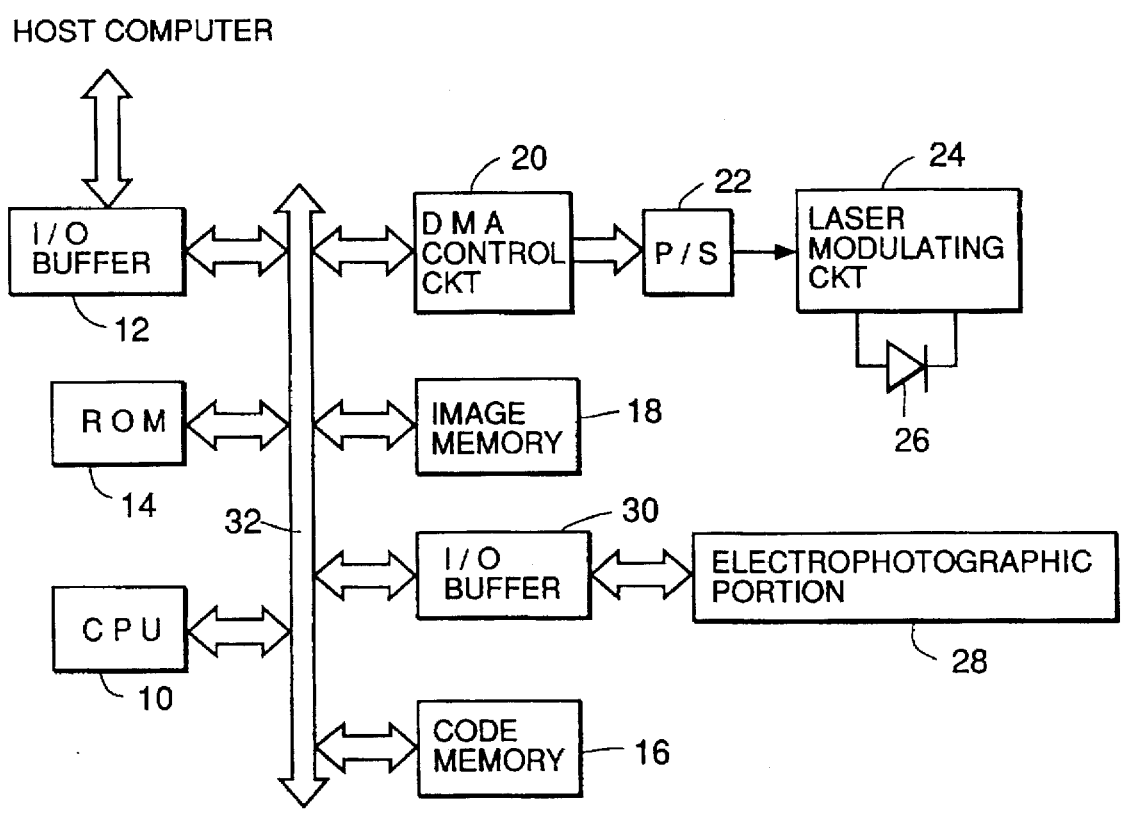
FIG. 1 is a block diagram of an embodiment of the present invention.
Figure 2:
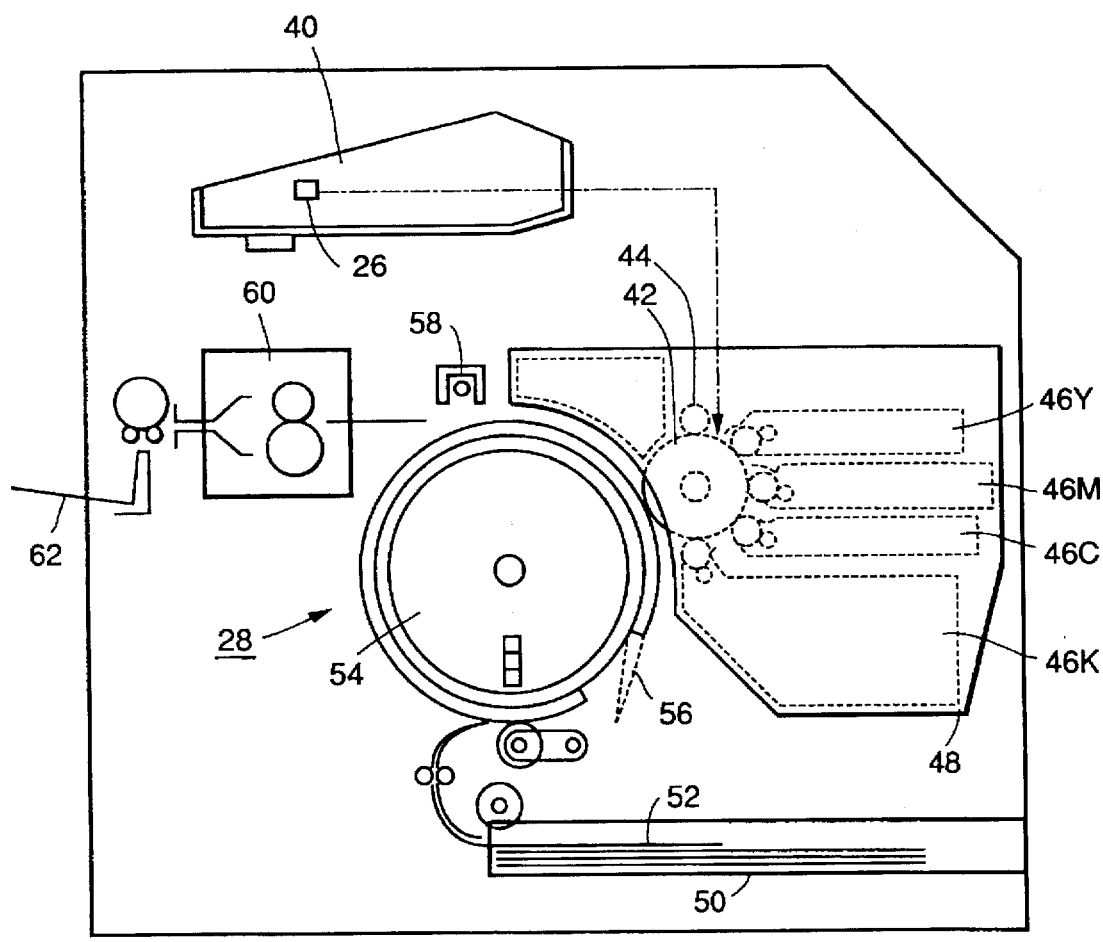
FIG. 2 is a cross-sectional view of the major components of the embodiment of FIG. 1.
Figure 3:
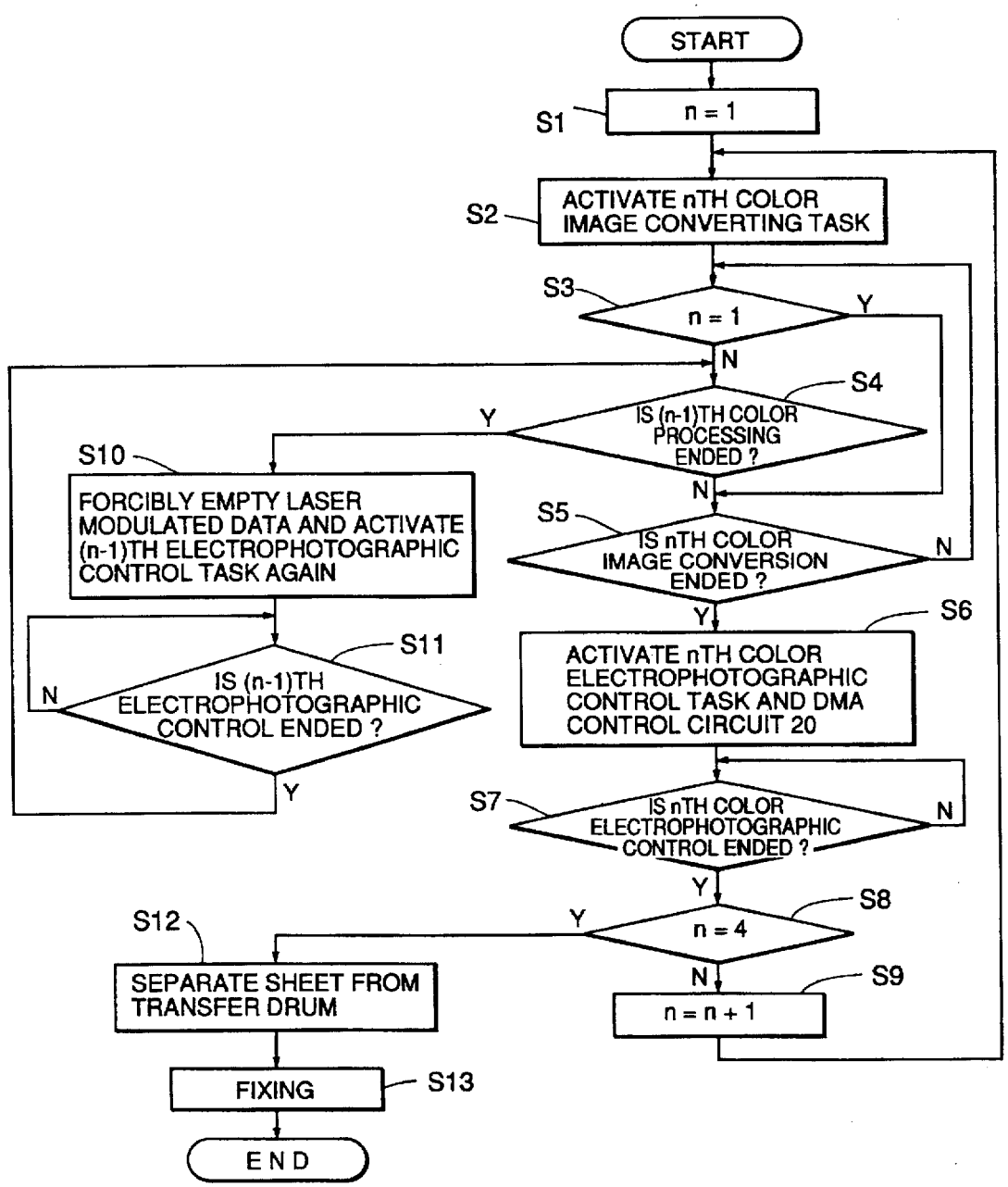
FIG. 3 is a flowchart of the operation of the embodiment shown in FIG. 1.

FIG. 1 is a block diagram showing the structure of an embodiment according to the present invention. FIG. 2 is a cross-sectional view of the major components of an electrophotographic printer. FIG. 3 is a flowchart of the operation of the embodiment of FIG. 1. Each of the printing colors (cyan, magenta, yellow and black) in this embodiment is binary data, but the operation hereof is equally usable in the case of multi-value color data.

Referring first to FIG. 1, a CPU 10 controls the entire printer. An I/O buffer 12 performs input of data from a host computer and output of data thereto. A ROM 14 stores various programs, including an entire control program, a printing process control program, a communication program used for communications with the host computer, and a raster image control program.

A code memory 16 stores the coded image data supplied from the host computer, e.g., character codes (hereinafter referred to as code data). The code data includes the contour data and color data for an image. An image memory 18 stores one page of the binary image data which has been converted from the code data stored in the code memory 16.

A DMA control circuit 20 reads out the image data in the image memory 18 using bit-by-bit direct memory access (DMA) in raster in sequence. A parallel/serial (P/S) converting circuit 22 converts the output data of the DMA control circuit 20 into serial data. A laser modulating circuit 24 modulates the laser beam of a laser diode 26 of a laser scanner by the output of the PS converting circuit 22. More specifically, the laser modulating circuit 24 modulates the laser beam of the laser diode 26 by a raster data pattern in accordance with image information in image memory 18.

An electrophotographic portion 28 includes various sensors and actuators in various components shown in FIG. 2. The electrophotographic portion 28 is connected to the CPU 10 through an I/O buffer 30 and a bus 32. The bus 32 performs mutual connection between the CPU 10, the I/O buffer 12, the ROM 14, the code memory 16, the image memory 18, the DMA control circuit 20, and the I/O buffer 30.

The internal structure of the embodiment will be described with reference to FIG. 2. A laser scanner 40 includes the laser diode 26, an unshown polygonal mirror for scanning the laser beam emitted from the laser diode 26 in a predetermined direction (e.g., in a horizontal direction perpendicular to the surface of the paper), and various lenses, reflectors and the like, so as to project the modulated laser beam onto the surface of photosensitive drum 42. Arranged around photosensitive drum 42 are a charging roller 44, a developer 46Y for accommodating yellow toner, a developer 46M for accommodating magenta toner, a developer 46C for accommodating cyan toner, and a developer 46K for accommodating black toner. In this embodiment, the developer 46K has a larger size than the other developers, since it is the most often used color. The photosensitive drum 42, the charging roller 44 and the developers 46Y, 46M, 46C and 46K are incorporated in a cartridge 48 so that they can be separated from a printer body as one unit.

A sheet cassette 50 accommodates printing sheets 52. A toner image is transferred on a printing sheet wound around a transfer drum 54. A paper grip 56 grips the printing sheet 52 on the transfer drum 54. A charger 58 performs discharging required to separate the printing paper from the transfer drum or charging. Reference numeral 60 denotes a fixer; and 62 denotes a tray for discharged sheets.

In this embodiment, after images of four colors, including yellow, magenta, cyan and black, are registered field-sequentially on the printing paper wound around the transfer drum, separation of the printing paper from the transfer drum, fixing and discharge are performed to form a color image.

The operation of the embodiment will be described below with reference to FIG. 3. The code data from the host computer is stored in the code memory 16 through the I/O buffer 12 and the bus 32. When the code data corresponding to one page has been stored in the code memory 16, the program shown in FIG. 3 is initiated.

First, a color variable n which assigns the printing color is initialized to 1 (S1). n=1 indicates printing in yellow. n=2 indicates printing in magenta. n=3 indicates printing in cyan. n=4 indicates printing in black. First, the nth (which is yellow in this embodiment) image converting task is activated (S2). In the image converting task, the code data corresponding to the color component designed by n is extracted from the code data stored in the code memory 16, the extracted code data is converted into image data, and the converted raster image data is stored in the image memory 18. The image converting task is executed concurrently with the operation shown in FIG. 3.

If it is determined that n=1 (S3), the process goes to S5, where CPU 30 determines whether conversion of the nth color, i.e., yellow since n=1, is completed. Until conversion of the nth color is complete, flow does not pass step S5. When it is complete, the nth color electrophotographic control task and the DMA control circuit 20 are activated (S6). More specifically, after the data obtained by extracting and converting the code data in the supplied code data which corresponds to the color component designated by the aforementioned n has been stored in the image memory 18, the electrophotographic control task is activated. In other words, the electrophotographic control task is not activated until after the image converting task has been completed.

When the electrophotographic control task has been activated, the CPU 10 controls the electrophotographic control portion 28 through the bus 32 and the I/O buffer 30. The electrophotographic control portion 28 controls and drives the individual components shown in FIG. 2 in the manner described below.

The electrophotographic control portion 28 activates a sheet conveying motor and a scanning motor for the laser scanner 40, and rotates the photosensitive drum 42 and the transfer drum 54. Also, the electrophotographic control portion 28 applies a predetermined high voltage to the charging roller 44 to charge the surface of the photosensitive drum 42. A sheet is taken out from the sheet cassette 50 and then conveyed toward the transfer drum 5. The sheet grip 56 catches the sheet and winds it around the transfer drum.

In the electrophotographic control task, in addition to the aforementioned control operations, the CPU 10 modulates the laser diode 26 using the raster image data pattern stored in the image memory 18. More specifically, the DMA control circuit 20 reads out the raster image data from the image memory 18, and supplies the read raster image data to the laser modulating circuit 24 through the P/S converting circuit 22. The laser modulating circuit 24 modulates the laser beam emitted from the laser diode 26 using the raster image data pattern. The laser beam emitted from the laser diode 26 is scanned in a horizontal direction by the laser scanner 40 and then made incident on the photosensitive drum. Since the photosensitive drum 42 is rotating in a predetermined timing, a latent image corresponding to the image data stored in the image memory 18 is formed on the photosensitive drum 42.

The latent image formed on the photosensitive drum 42 is converted into a toner image of yellow by the yellow developer 46Y, first. The toner image on the photosensitive drum 42 is transferred onto the sheet wound around the transfer drum 54 as the photosensitive drum 42 and the transfer drum rotate. Even after the toner image has been transferred, the transfer drum 54 continues rotating at a predetermined speed.

The CPU 10 waits for the completion of the electrophotographic control task (S7). If it is determined that the electrophotographic control task has been completed (S7), n is incremented in a case other than that in which n=4 (S9), and then the process returns to S2. In other words, the magenta (n=2) image converting task is activated to start the magenta image conversion in the same manner as that of yellow (n=1) (S2).

After the magenta (n=2) image converting task has been activated (S2), it is determined whether a predetermined period of time has elapsed after the electrophotographic process in the immediately preceding ((n−1)th) color, i.e., yellow (n=1), has been completed or whether the transfer drum 54 is at a predetermined position (S4). (Step S4 in FIG. 3 is written in simplified language, and the aforementioned operation actually is executed, i.e., it is determined in step S4 whether the yellow toner image has been transferred on the transfer sheet on the transfer drum 54 and then the transfer drum 54 has been rotated to a position where the magenta toner image can be transferred.

If it is determined that formation of the toner image of a subsequent color is not yet ready, i.e., if the nth color image conversion is not yet completed (S5) but the (n−1)th color processing is complete and the transfer drum has been rotated to a position where it is ready to receive the nth toner image (S4), the process goes from S4 to S10. In step S10, the laser modulated data is forcibly emptied to restrict laser illumination on the photosensitive drum 42, and then the electrophotographic control task of the n−1th color, i.e., yellow since n=2, is activated again. This ensures that there is no interruption in the electrophotographic process, the transfer drum 54 being fed blank during this process since no yellow toner image is formed on the photosensitive drum 42. Thereafter, completion of the electrophotographic control task of the n−1th color is awaited (S11).

When the (n−1)th color image formation has been completed and transfer of the magenta toner image onto the transfer drum 54 is thereby ready (S4), and when the magenta image converting task has been completed (S5), flow advances to step S6 where the nth color electrophotographic control task is started, i.e., the electrophotographic control task of magenta is activated in the same manner as that of yellow. After the electrophotographic control task of magenta has been completed (S7), n is incremented (S9), and the electrophotographic process of cyan (n=3) is started.

In both cyan (n=3) and black (n=4), the transfer drum 54 is fed blank (S4, 10, 11) until the image converting task is completed, i.e., until the latent image on the photosensitive drum 54 is converted into a toner image and transfer of that toner image onto the transfer drum 54 is ready. When n=4, i.e., when the image converting task of black has been completed and transfer of a toner image of black onto the transfer drum 54 is ready (S5), the control flow goes from step S5 to step S6, and the electrophotographic control task of black is activated (S6). Completion of the electrophotographic control task of black is awaited (S7), whereby toner images of respective colors have been attached on the sheet wound around the transfer drum 54.

When n=4, which is the final color, the control flow goes from S8 to S12, and a high voltage is applied to the separation charger 58 to separate the sheet wound around the transfer drum 54 (S12). Thereafter, the toner images are fixed by the fixer 60, and then the fixed sheet is discharged onto the discharge tray 62 (S13).

In this embodiment, when transfer of the toner image of a preceding color onto the sheet wound around the transfer drum 54 has been completed before the image converting task of a subsequent color is completed, i.e., before the converted raster data of a subsequent color is stored in the image memory, the transfer drum 54 is idled by feeding it blank to a predetermined position whereby the electrophotographic process is not interrupted. Thus, immediately after the converted raster image data of a subsequent color has been stored in the image memory, formation of a latent image, development of the latent image and transfer of a toner image onto the transfer drum can be initiated. Therefore, the printing time can be greatly reduced, and the required memory capacity of the image memory 18 is that for only a single color rather than that for all four colors.

An electrophotographic color printer has been described above. However, the present invention can also be applied to other types of color image forming apparatus.

Furthermore, it is to be understood that changes and variations may be made without departing from the spirit and scope of the following claims.

As will be understood from the foregoing description, it is possible according to the present invention to perform multicolor printing at a high speed with a small memory capacity.

What is claimed is:

1. An image forming apparatus for forming an image, comprising:

input means for inputting image data of a first color component and image data of a second color component which differs from the first color component, the image data of the first and second color components having been converted from code data, wherein the code data is provided by code providing means;

writing means for writing into a memory the image data of the first color component;

output means for reading out the image data of the first color component which has been written in said memory and for outputting the read-out image data to a color image forming device;

means for causing said writing means to write into the memory the image data of the second color component, and for causing said output means to read out the image data of the second color component and to output the read-out image data to said color image forming device; and means for controlling said color image forming device to form an image based on the read-out image data outputted by said output means for the first color component, and thereafter to enter a wait state until after said writing means has completed writing the image data for the second color component into the memory.

2. The image forming apparatus according to claim 1, wherein said first color component data is a yellow component.

3. The image forming apparatus according to claim 1, wherein said second color component data is a magenta component.

4. The image forming apparatus according to claim 1, wherein after said writing means has completed writing the image data for the second color component into the memory, said control means causes the color image forming device to terminate the wait state and to form an image based on the read-out image data outputted by said output means for the second color component.

5. The image forming apparatus according to claim 1, wherein said color image forming means includes: means for modulating a laser beam according to the image data read out from said memory; a photosensitive member onto which the laser beam modulated by said modulation means is illuminated; and transfer means for transferring an image formed on said photosensitive member onto a sheet.

6. The image forming apparatus according to claim 1, wherein said input means includes means for inputting the code data and means for converting the code data into the image data.

7. An image forming method of forming an image, said method comprising the steps of:

inputting image data of a first color component and image data of a second color component which differs from the first color component, the image data of the first and second color components having been converted from code data, wherein the code data is provided by code providing means;

writing, into a memory, the image data of the first color component;

reading out the image data of the first color component which has been written in said memory and outputting the read-out image data to a color image forming device;

causing said writing step to write into the memory image data of the second color component, and causing said reading out step to read out the image data of the second color component and to output the read-out image data to the color image forming device; and controlling the operation of the color image forming device to form an image based on the read-out image data outputted in said reading out step for the first color component, and thereafter to enter a wait state until after said writing step has completed writing the image data for the second color component into the memory.

8. The image forming method according to claim 7, wherein said first color component data is a yellow component.

9. The image forming method according to claim 7, wherein said second color component data is a magenta component.

10. The image forming method according to claim 7, wherein after said writing step has completed writing the image data for the second color component into the memory, the controlling step causes the color image forming device to terminate the wait state and to form an image based on the read-out image data outputted in said reading step for the second color component.

11. The image forming method according to claim 7, including the steps of: modulating a laser beam according to the image data read out in said reading step; illuminating a photosensitive member with the laser beam modulated in said modulating step; and transferring an image formed on said photosensitive member onto a sheet.

12. The image forming method according to claim 7, wherein said inputting step includes a step for inputting the code data and a step of converting the code data into the image data.

13. A color image forming apparatus comprising:

input means for inputting a code signal;

an image memory;

image conversion means for converting image data of a single color to be printed from the code signal and for storing converted image data in said image memory;

a photosensitive drum;

latent image formation means for forming a latent image corresponding to the image data stored in said image memory on said photosensitive drum;

developing means disposed around said photosensitive drum for each of a plurality of additional colors which include at least first and second colors, to convert a latent image on said photosensitive drum into a toner image of each of the additional colors;

transfer means for transferring the toner image onto a sheet;

fixing means for fixing the toner image on the sheet; and control means for idling said transfer means up to a predetermined position when said transfer means has completed transferring the toner image of a first color onto the sheet before said image conversion means completes conversion of an image of a second color of the additional colors which follows the first color.

14. A color image forming apparatus according to claim 13, wherein said additional colors include yellow, magenta, cyan and black.

15. A color image forming apparatus according to claim 13, wherein said transfer means includes means for carrying the sheet.

16. A color image forming method comprising the steps of:

inputting a color image;

storing the color image to be printed in an image memory as a raster image in one of plural colors which include at least first and second colors;

transferring a toner image corresponding to the raster image onto a sheet in one of the colors; and pausing a transfer operation of the toner image onto the sheet when a transfer operation of the toner image of a first color onto the sheet has been completed before a storing operation of the raster image of a second color which follows the first color is completed.

17. A color image forming method according to claim 16, wherein said image memory has a capacity which enables single color data in said color image to be stored.

18. A color image forming method comprising the steps of:

inputting code data;

converting the code data for a predetermined color into a raster image of the predetermined color;

a first determining step of determining whether the converting step has been completed;

a second determining step of determining whether a transfer device, by which a toner image corresponding to the raster image is transferred onto a sheet, is ready to receive the raster image of the predetermined color; and idling the transfer device, in a case where the transfer device is ready to receive the raster image of the predetermined color but conversion of the predetermined color into raster image data is not complete.

19. The method according to claim 18, wherein said second determining step includes the step of determining whether color image precessing of the raster image for a previous color is complete.

20. The method of according to claim 8, wherein said idling step includes the step of feeding the transfer device without the raster image.

21. The method according to claim 18, wherein said idling step includes the step of feeding the transfer device without the raster image to a predetermined position, and further comprising the step of repeating at least said first determining step after the transfer means has reached the predetermined position.

22. The method according to claim 21, further comprising the step of forming an image by laser beam modulation in accordance with the raster image data, wherein said idling step includes the step of forcibly restricting laser beam illumination.

23. A color image forming method comprising the steps of:

inputting code data for a first color;

a first converting step of converting the code data for the first color into raster image data in a page memory;

a first modulating step of modulating a laser beam in accordance with the raster image data of the first color in the page memory thereby to form a first color image on a transfer device;

inputting code data of a second color;

a second converting step, commenced after completion of said first modulating step, of converting the code data of the second color into raster image data in the page memory;

forcibly restricting laser beam illumination and idling the transfer device in a case where said second conversion step is not yet completed but the transfer device is ready to receive second color image information; and a second modulating step of modulating a laser beam in accordance with the raster image data of the second color in the page memory in a case where said second converting step is complete and the transfer device is ready to receive image information.

24. The method according to claim 23, wherein said idling step includes the step of feeding the transfer means without a raster image to a predetermined position and wherein said second modulating step is commenced after the transfer means has been fed to the predetermined position.

25. The method according to claim 23, wherein said forcible restricting and idling step is repeated until said second converting step is complete.

26. The method according to claim 23, further comprising the steps of converting code data for third and fourth colors into raster image data in the page memory and modulating a laser beam in accordance with raster image data of the third and fourth colors in the page memory thereby to form a full color image on the transfer device.

27. A color image forming method comprising the steps of:

inputting a color image;

converting the color image to be printed into a raster image;

storing the raster image into an image memory in one of plural colors which include first and second color;

forming a toner image corresponding to the raster image onto a sheet in one of the plural colors; and pausing a forming operation of the toner image onto the sheet when a forming operation of the toner image of a first color onto the sheet has been completed before a converting operation of the raster image of a second color which follows the first color is completed.

28. A color forming method comprising the steps of:

inputting a color image;

converting the color image to be printed into a raster image;

storing the raster image into an image memory in one of plural colors which include first and second colors;

illuminating a laser beam to form a latent image corresponding to the raster image on a photosensitive member in one of the colors;

transferring a toner image corresponding to the latent image onto a sheet in one of the colors; and pausing an illuminating operation of the laser beam onto the photosensitive member when a transferring operation of the toner image of a first color onto the sheet has been completed before a converting operation of the raster image of a second color which follows the first color is completed.

* * * * *

UNITED STATES PATENT AND TRADEMARK OFFICE
CERTIFICATE OF CORRECTION

PATENT NO. : 5,701,182

DATED : December 23, 1997

INVENTOR(S) : Kenjiro Hori, et al.

It is certified that error appears in the above-identified patent and that said Letters Patent is hereby corrected as shown below:

```
        Column 1, line 41, change "blacks" to --black--.

Column 2, line 7, change "blacks" to --black--.

Column 4, line 3, change "designed" to
--designated--.

Column 5, line 29, change "n-1th" to --(n-1)th--.

Claim 20, column 8, line 52, change "of according
to Claim 8" to --according to Claim 18--.

Claim 27, column 10, line 7, change "color" to
--colors--.
```

Signed and Sealed this

First Day of December, 1998

Attest:

BRUCE LEHMAN

*Attesting Officer*     *Commissioner of Patents and Trademarks*